June 9, 1925.
C. H. KENRICK
STEERING WHEEL
Filed May 6, 1924
1,540,992
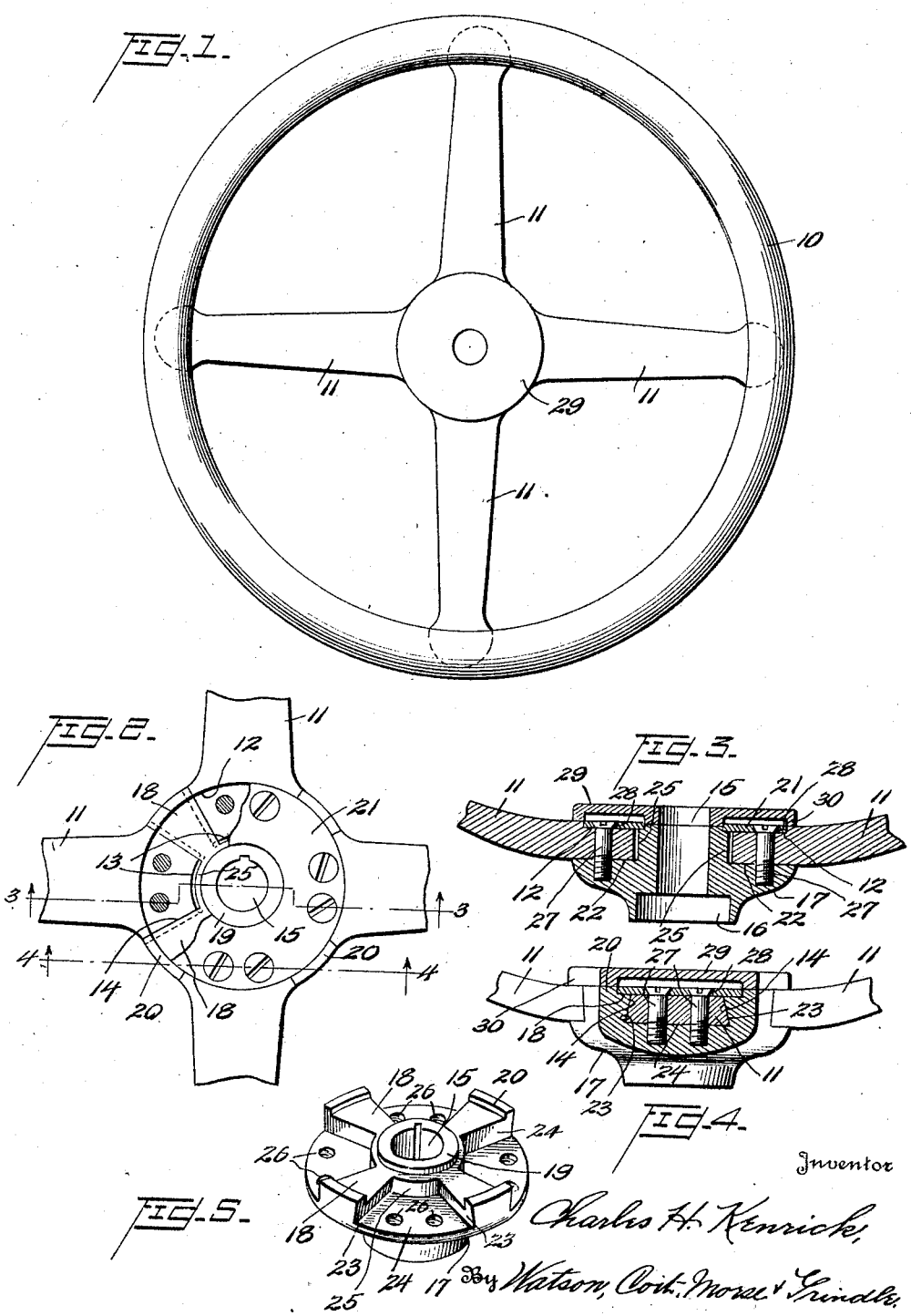

Patented June 9, 1925.

1,540,992

UNITED STATES PATENT OFFICE.

CHARLES H. KENRICK, OF ONAWAY, MICHIGAN.

STEERING WHEEL.

Application filed May 6, 1924. Serial No. 711,474.

*To all whom it may concern:*

Be it known that I, CHARLES H. KENRICK, a citizen of the United States, and a resident of Onaway, in the county of Presque Isle and State of Michigan, have invented certain new and useful Improvements in Steering Wheels, of which the following is a specification.

This invention relates to steering wheels of the type which are used on motor vehicles, such as automobiles, trucks, motor boats and aeroplanes. It relates particularly to steering wheels of the type stated in which the rim and spokes are formed of wood, and the hub is formed of a metal clamping and holding device for rigidly securing the spokes therein.

It is an object of this invention to provide in a steering wheel of the class described, a hub structure having open end and open side sockets adapted to securely retain therein a plurality of wood spokes.

It is a further object of this invention to provide in a hub structure for wood spoke steering wheels, means to retain the spokes within the hub under the restraining action of the rim of the wheel so that the spokes cannot be removed until the rim has been removed from the spokes.

The particular advantages of a wood rim and wood spokes in a steering wheel of the type mentioned are well known, but it has been found that considerable expense is involved in forming a wood hub of suitable strength to hold the spokes. The present invention therefore deals with a method of fastening wood spokes into a one-piece cast metal hub, which involves a simplified spoke construction; the elimination of considerable fitting, gluing and finishing; a material reduction in the cost of production; a more rapid production, since it is not necessary to wait for glue to dry; and a considerable saving of wood; all without sacrificing any of the desirable qualities of the all wood wheel, such as strength, lightness and appearance.

While it has been the general practice for a number of years to form wagon wheels with wood spokes, the problem is entirely different from that of making a steering wheel, since a steering wheel is limited to about four spokes owing to the necessity of leaving the major portion of the rim free to be grasped by the driver's hands. Furthermore, wagon wheels are used only to support the direct weight thereon, whereas a steering wheel is used to transmit rotational forces. These two major differences require that the means for fastening the spokes to the hub shall be capable of resisting considerable torsional strain and that they shall be very rigid and not capable of being worked loose due to use and vibration. This invention is therefore directed mainly to the hub structure and the means of fastening the spokes therein.

This invention may be understood by reference to the following specification taken in conjunction with the accompanying drawings, wherein:—

Figure 1 is a plan view looking down on the steering wheel embodying the present invention, Figure 2 is a plan view of the hub section with the cover plate removed and a part of the retaining washer broken away.

Figure 3 is a vertical section on the line 3—3 of Figure 2,

Figure 4 is a vertical section on the line 4—4 of Figure 2, and

Figure 5 is a perspective view of the hub member.

In the embodiment of the invention shown for purposes of illustration, the rim 10 is of the usual form, rounded in section and made of laminated wood, and the spokes 11, usually four in number, are also made of wood and are preferably at a slight angle to the plane of the rim and are fitted into the rim in any well known manner, such as that described in the patent to Snyder Patent No. 1,469,194, granted September 25, 1923. The spokes preferably taper in thickness and in width from the hub portion to the rim, and their inner end portion is reduced in thickness as shown at 12. This inner end portion is cut away on the arc of a cylinder as shown at 13. The inner end of each spoke is further defined by two edges 14 formed by planes, each containing as an element a radius of the arc 13 but converging toward each other above the spoke, thus forming a sort of tapered dove-tail.

The hub member comprises a single piece casting preferably made of aluminum and provided with the central bore 15 adapted to fit over the steering post and with the counter-bore 16 adapted to fit over the steering column jacket. This casting is circular in form and has a curved under surface 17 connecting the cylindrical portion to the rim of the counter-bore to give it a pleasing shape and appearance, and a flat upper surface, which is cut away as at 18 between a rim 19 surrounding the bore 15 and a rim 20 at the outer edge of the hub so as to receive in the depression thus formed a retaining washer 21, preferably formed of sheet steel, and having substantially the same thickness as the depth of the depression formed in the upper surface of the hub. The hub is also provided with four sockets 22 which are shaped to accommodate the inner ends of the spokes and having the undercut radial side walls 23 and the flat bottoms 24 thus forming the corresponding part of the dovetail joint. The inner wall of each socket is formed by the upstanding boss 25 surrounding the bore at the center of the hub, and this boss is adapted to be closely approached by the curved or straight end portions 13 of the spokes.

The thickness of the inner end portion of each spoke is exactly the same as the depth of a socket from the bottom 24 to the surface 18, whereas the greatest thickness of each spoke is equivalent to the vertical height from the bottom 24 to the top of the rim 20, so that when the spokes are driven into position in the hub with the faces 14 engaging the walls 23 and the retaining washer 21 put in place, the inner ends of the spokes exactly fill the sockets 22 between the bottoms 24 and the under surface of the washer 21 which rests in the cut away portion of the hub, and the portions of the spokes outside of the washer are flush with the top of the rim 20.

When the spokes and washer are in this position, a pair of vertical holes 26 is drilled through the washer, each spoke, and into the lower portion of the hub. The portions of these holes in the hub are then tapped to accommodate machine screws 27. The holes in the washer are countersunk as shown at 28 and flat headed machine screws are then threaded into these holes in order to retain the washer tightly down on top of the spokes and also to retain the spokes within the hub member against any radial displacement. After the spokes are in position and rigidly fastened, the rim can be then fastened on by moving it in an axial direction to engage sockets in its undersurface with the ends of the spokes, and it will be noted that with the spokes in position and retained by the rim against any radial movement, they are securely locked in the hub, even without the use of the retaining washer and screws, since the dovetail joints prevent the spokes from being lifted upward and removed from the hub while the rim prevents any radial movement thereof. It will thus be noted that the retaining washer and screws are merely an added safety feature materially strengthening the wheel structure.

It is sometimes desirable to make the retaining washer 21 slightly thicker than the depression in which it fits in order that a cap member 29, preferably cast of aluminum, may be applied over the retaining washer in order to hide the screws and give a finished appearance to the wheel. This cap member, as shown, is circular in form and has a depending flange 30 of such a size as to snugly engage over the upstanding portion of the retaining washer, thus preventing any lateral displacement of the cap member. A similar depending flange is provided around the central opening in the cap member, which corresponds to the bore 15 in the hub, in order to rigidly support it from the hub so that a lock nut or other retaining means may be used to fasten the whole structure to the steering post without bending the cap and yet serving to retain it in proper position.

Each spoke of this wheel may be formed of a single piece of wood, cut or bent to the desired shape, or they may be made of two or more pieces of laminated wood, to give them added strength, or for the purpose of using smaller pieces of wood, and thus effecting a material saving in the cost of construction, and at the same time adding to the strength of the wheel.

While a particular embodiment of this invention has been disclosed, it is not to be construed as limiting the invention to this particular modification, for it is to be understood that the invention is only limited by the scope of the attached claims.

Having thus described my invention what I claim as new and desire to secure by U. S. Letters Patent is:

1. A steering wheel, comprising in combination, a wood rim, a plurality of wood spokes and a one piece metallic hub, said hub having a dovetail connection with each spoke, said dovetail connection retaining said spokes against movement axially of the wheel and allowing radial movement thereof.

2. A steering wheel, comprising in combination, a wood rim, a hub, a plurality of wood spokes connecting said hub and rim, said hub being a one piece metallic structure having an open sided and open ended socket for each spoke, said sockets being shaped with walls overhanging to retain said spokes against movement axially of said wheel.

3. A steering wheel, comprising in combination, a rim, a hub, a plurality of spokes connecting said hub and rim, said hub being a unitary structure having a recessed top and radial spoke receiving sockets, said sockets being open at the top of said hub and so shaped that together with said rim they retain the spokes against movement out of said hub in any direction.

4. A steering wheel, comprising in combination, a wood rim having axially and radially disposed sockets therein, a one piece metallic hub having radially disposed sockets therein, wood spokes fitting in said sockets and connecting said hub and rim, the sockets in said hub being tapered from the center outward, open on one face of the hub at right angles to the axis thereof, and wider at the face opposite said open face than at any other portion.

5. A steering wheel, comprising in combination, a continuous rim adapted to be grasped by the hand of the operator, a plurality of wood spokes secured at their outer ends to the rim, extending inwardly at an angle to the plane of the rim and having tapered inner end portions of reduced thickness with the upper and lower surfaces parallel to the plane of the rim, a unitary metallic hub member having radial sockets therein to receive the inner ends of the spokes, the walls of said sockets closest to and in a plane parallel to that of the rim being cut away, a retaining washer covering the openings in the sockets, and axially extending fastening means retaining said washer in place and passing through the inner ends of the spokes.

6. A steering wheel, comprising in combination, a wood rim, a plurality of wood spokes, a one piece metallic hub, said hub having a dovetail connection with each spoke and retaining said spokes against movement axially of the wheel, and a fastening means passing through each spoke and parallel to the axis of the wheel.

7. A steering wheel, comprising in combination, a wood rim, a hub, a plurality of wood spokes connecting said hub and rim, said hub being a one piece metallic structure having an open sided and open ended socket for each spoke, means integral with the hub to retain said spokes against movement axially of said wheel, and a retaining washer closing the open sides of said sockets and held in position by fastening means passing through said washer, said spokes, and into the hub.

8. A steering wheel, comprising in combination, a rim, a hub, a plurality of spokes connecting said hub and rim, said hub being a unitary structure having a recessed top and radial spoke receiving sockets, said sockets being open and narrower at the top of said hub than at the bottom, constituting means whereby the sockets retain the spokes against movement out of said hub in an axial direction, and a retaining washer, filling the recess in the top of said hub closing the open side of said sockets and retained in position by fastening means passing through said spokes and into said hub.

9. A steering wheel, comprising in combination, a continuous wood rim, a plurality of wood spokes secured at their outer ends to the rim, extending inwardly at an angle to the plane of the rim and having their inner ends tapered in width and reduced in thickness, the upper and lower surfaces of said inner ends being parallel to the plane of said rim, and a one piece metallic hub member having radial sockets to receive the inner ends of said spokes, said sockets being open on one side and one end and tapered in two directions to prevent movement of the spokes in any but a radial direction.

10. A steering wheel, comprising in combination, a continuous wood rim, a plurality of wood spokes secured at their outer ends to said rim, extending inwardly at an angle to the plane of the rim and having tapered inner ends with upper and lower surfaces parallel to the plane of the rim, a hub member having radial sockets to receive said spokes, one wall of said sockets being cut away to expose the full upper surface of said reduced spoke ends, the side walls of said sockets intersecting the lower wall at acute angles.

In testimony whereof I hereunto affix my signature.

CHARLES H. KENRICK.